Figure 1:
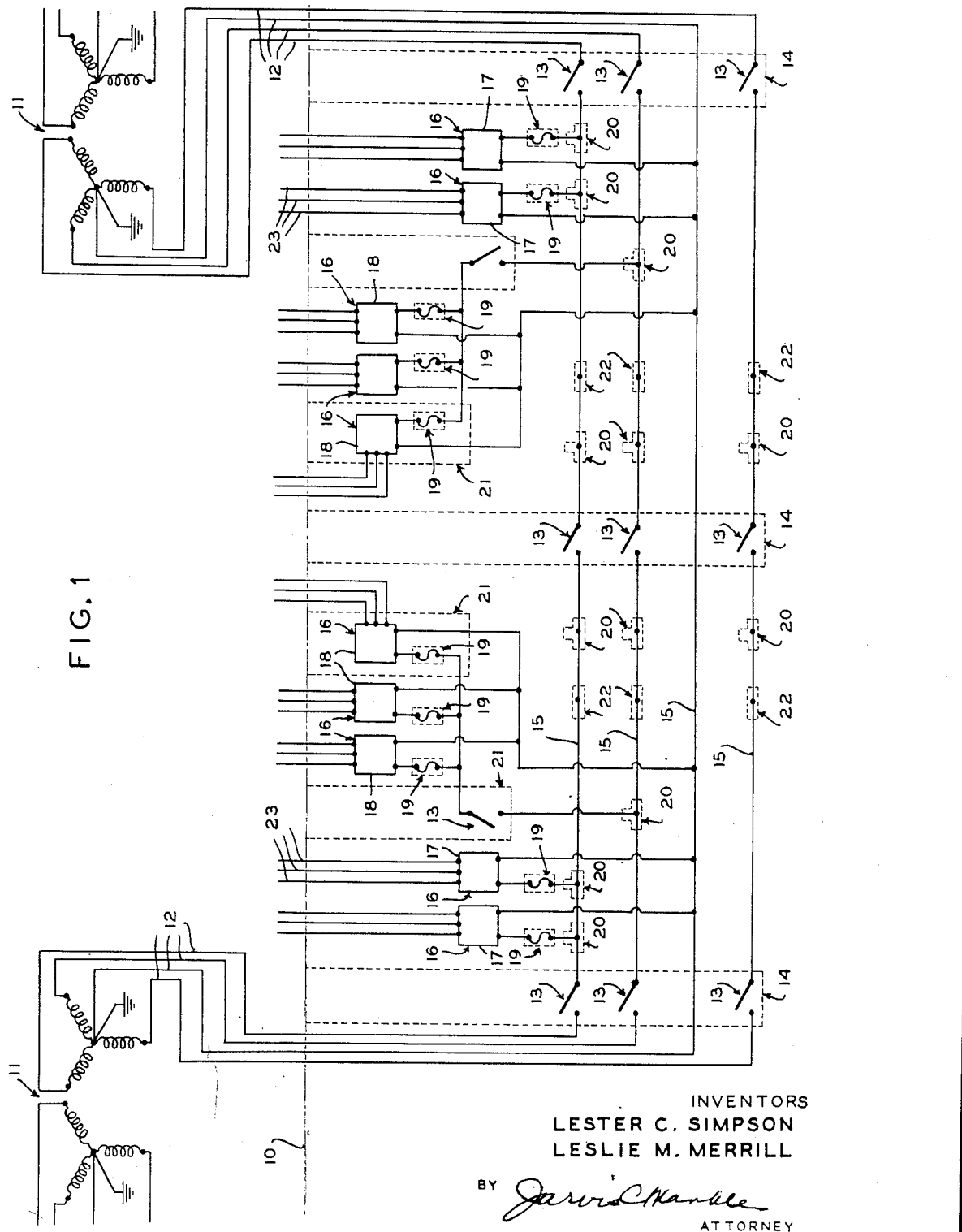

INVENTORS
LESTER C. SIMPSON
LESLIE M. MERRILL
BY *Jarvis C. Hardle*
ATTORNEY

March 12, 1957

L. C. SIMPSON ET AL 2,785,319

DIRECT BURIAL ELECTRICAL DISTRIBUTION
SYSTEM AND COMPONENTS

Filed Nov. 17, 1950

7 Sheets-Sheet 2

INVENTORS
LESTER C. SIMPSON
LESLIE M. MERRILL
BY *Jarvis C. Marble*
ATTORNEY

INVENTOR.
Lester C. Simpson
Leslie M. Merrill
BY
Jarvis Marble
ATTORNEY

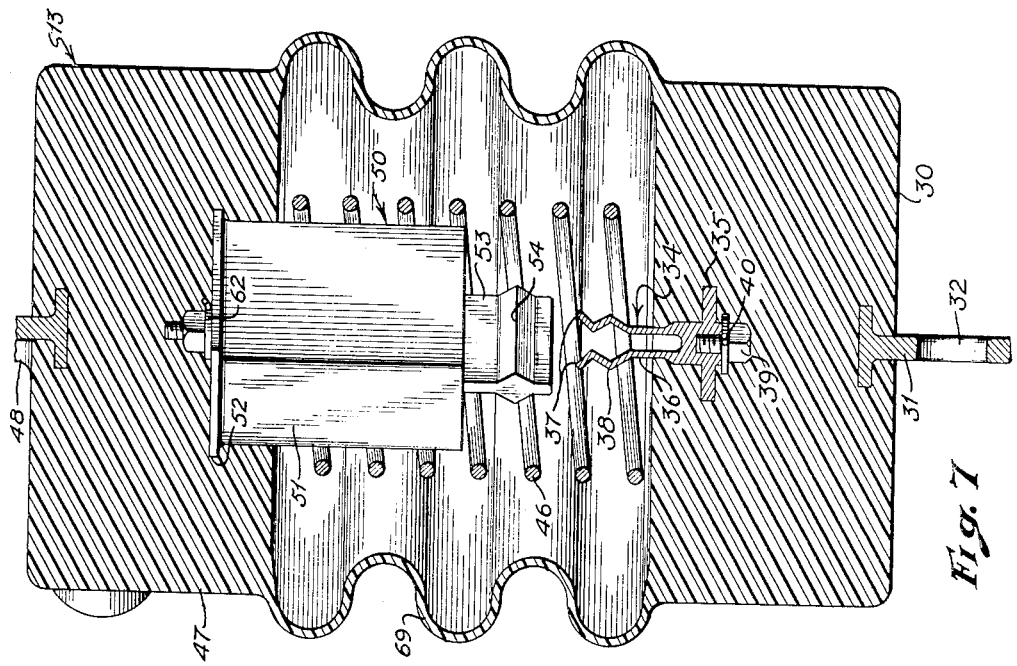
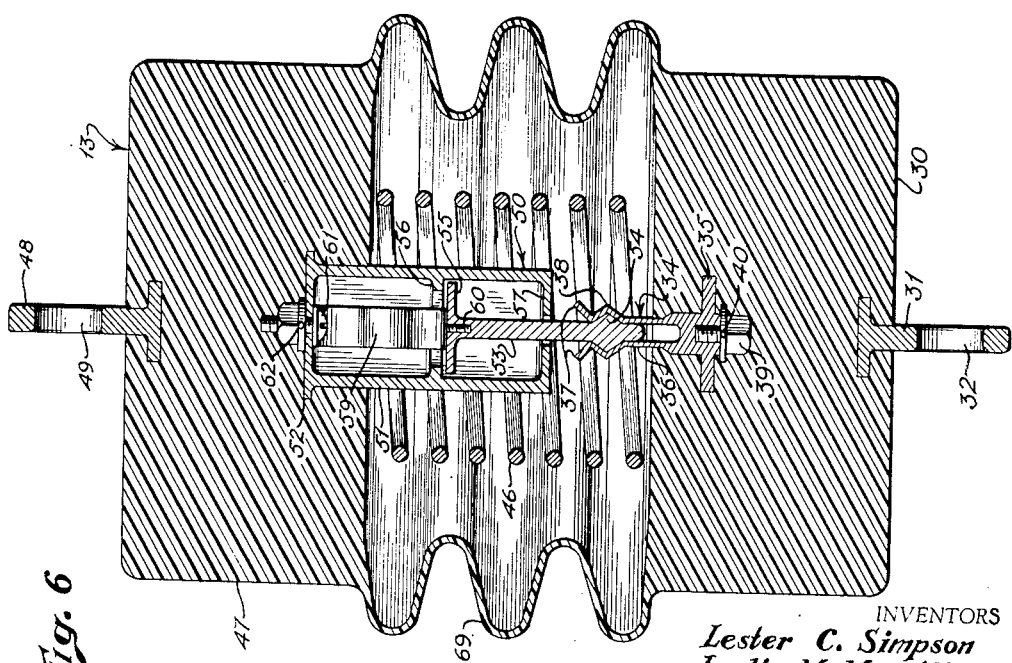
Fig. 7
Fig. 6
INVENTORS
Lester C. Simpson
Leslie M. Merrill
BY Jarviol Marble
ATTORNEY INVENTORS
Lester C. Simpson
Leslie M. Merrill BY Jarviol Marble

ATTORNEY

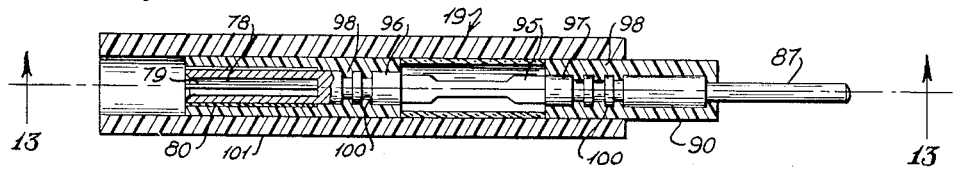

March 12, 1957

L. C. SIMPSON ET AL 2,785,319

DIRECT BURIAL ELECTRICAL DISTRIBUTION
SYSTEM AND COMPONENTS

Filed Nov. 17, 1950

7 Sheets-Sheet 7

INVENTORS
LESTER C. SIMPSON
LESLIE M. MERRILL

BY *Jarvis C. Marble*

ATTORNEY

United States Patent Office 2,785,319
Patented Mar. 12, 1957

2,785,319

DIRECT BURIAL ELECTRICAL DISTRIBUTION SYSTEM AND COMPONENTS

Lester C. Simpson, Alexandria, Va., and Leslie M. Merrill, Westfield, N. J., assignors to Elastic Stop Nut Corporation of America, a corporation of New Jersey Application November 17, 1950, Serial No. 196,305

20 Claims. (Cl. 307—147)

This invention relates to electricity and more particularly to the transmission of such electricity from a substation or other source to the point of ultimate use.

For many years it has been almost universal practice to install electrical distribution systems by stringing conductors on poles or other supports and, as is well known, such systems are very expensive both from the standpoint of original installation and from the standpoint of maintenance since ice, sleet, and severe storms tend to inflict extensive damage on such systems.

Numerous attempts have been made to install such systems underground but these have met with numerous difficulties particularly in view of the fact that components were not available which did not require extreme protection from moisture and the elements. In most of these installations it was found to be necessary to install the conductors in protective conduits and also to install other components such as transformers, switches, fuses and the like in vaults or manholes which were substantially moisture-proof and which consequently were of relatively expensive construction. Since most of the components employed in these systems were of the type which had heretofore been used in elevated systems, frequent failures were experienced since these components were not properly designed and constructed to withstand the extreme conditions encountered in direct burial use.

There has long been a need in rural areas for an electrical distribution system which did not require the use of poles or other aerial supports since it is necessary in such systems to cover very great distances and the cost of the installation of such a system is materially increased by such distances and also in the application of a distribution system to airport lighting, particularly such systems as are used by the armed services in advanced bases where it is frequently necessary to install such systems at a minute's notice and to remove them in the same length of time and transfer them elsewhere the system and components of this invention find particular utility.

It is therefore an object of this invention to provide an electrical distribution system in which all of the components as well as the conductors are buried in the ground without the necessity of providing protective conduits or special vaults or manholes therefor.

It is a further object of the invention to provide an electrical distribution system in which all of the components and conductors from the electrical generating station or other source are completely concealed beneath the earth and are only exposed at the point of use.

It is a further object of the invention to provide a direct burial electrical distribution system in which the various components such as transformers, connections, fuses, switches and the like are adapted to be directly buried in the earth without the provision of any other protective means, such as manholes or vaults.

It is a further and very important object of the invention to provide an electrical distribution system which is a substantial duplicate of the systems heretofore installed above ground which is completely concealed beneath the ground and which serves the same purpose with relatively little maintenance.

Figure 2:
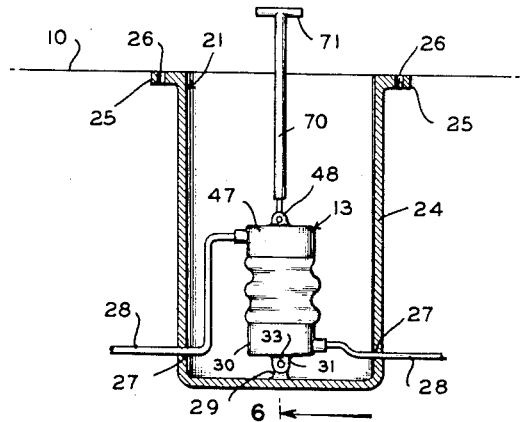
Figure 3:
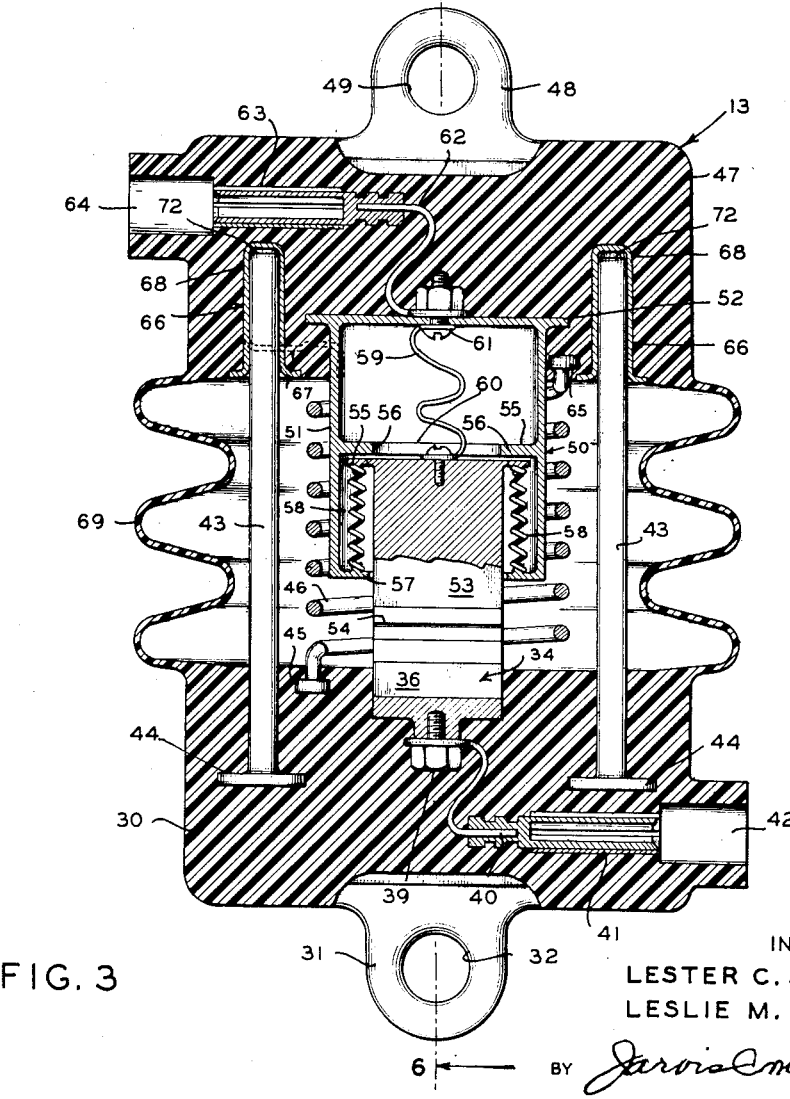
Figures 4, 5:
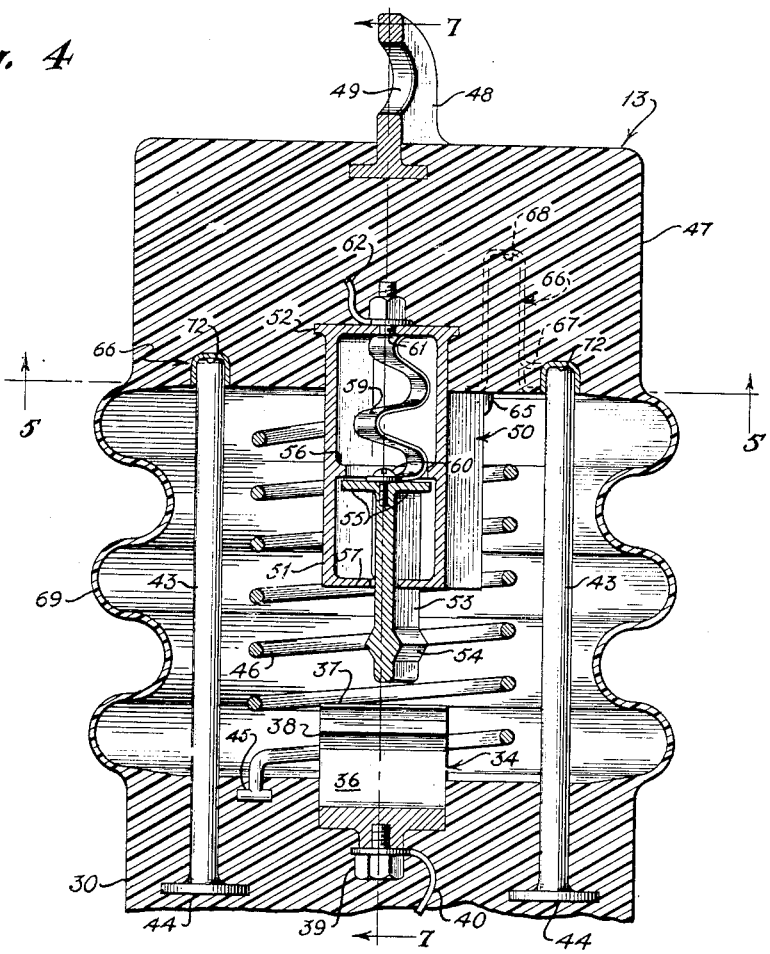
Figure 8:
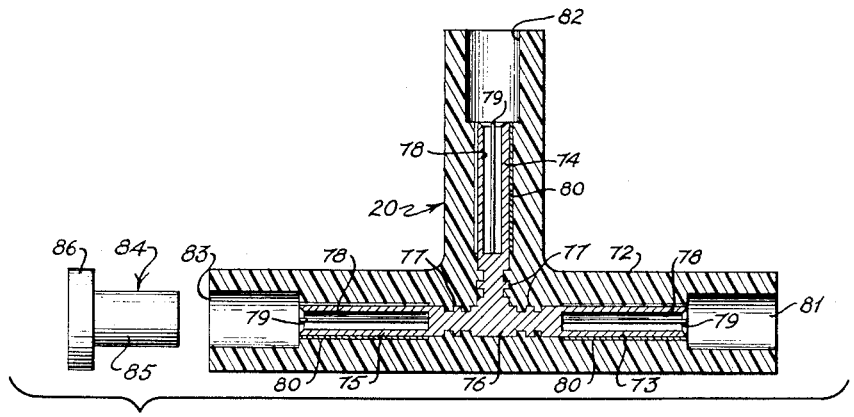
Figure 9:
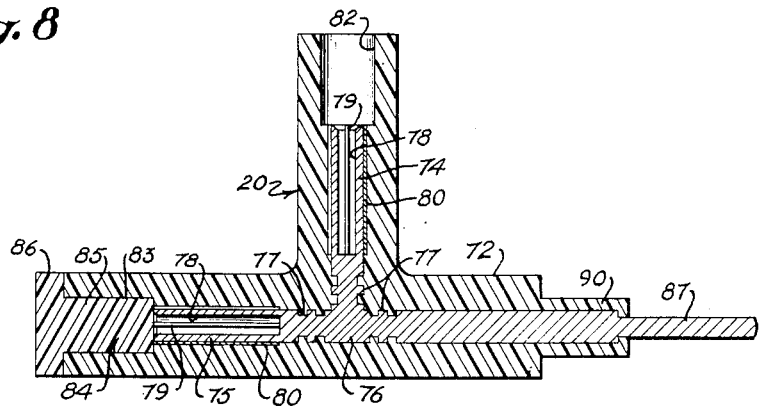
Figure 10:
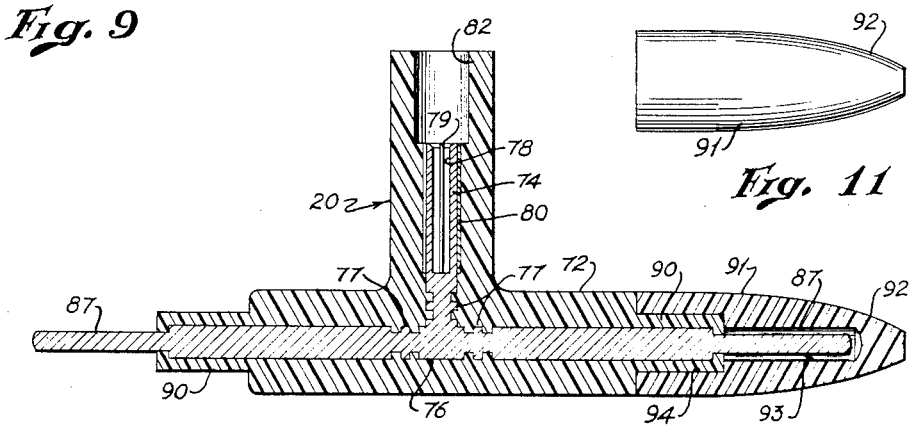
Figure 11:
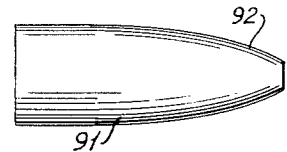
Figure 19:
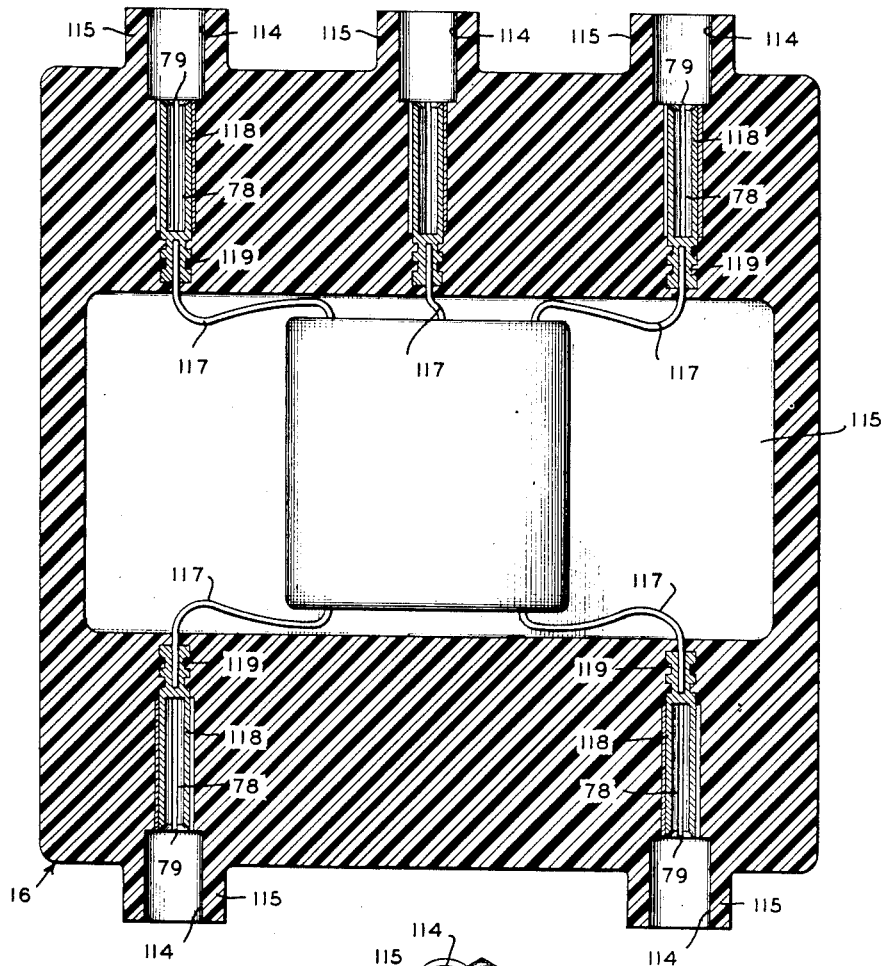
Figure 18:
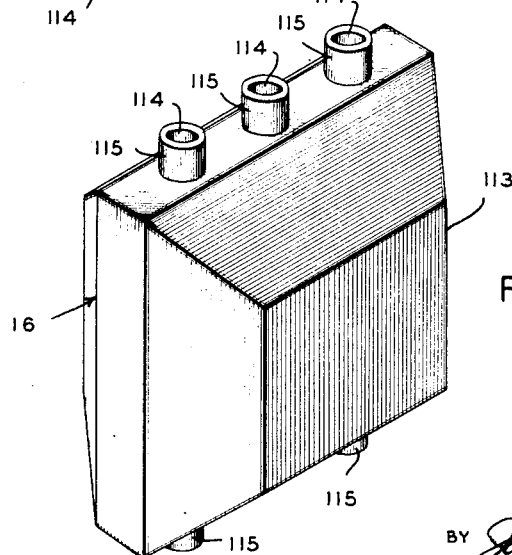

Further objects and advantages of the invention will be apparent from the following description taken in conjunction with the accompanying drawings, wherein:

Fig. 1 is a schematic view showing a typical electrical distribution system in accordance with this invention;

Fig. 2, a sectional view showing a switch which may be installed in an access handhole or which may be directly buried in the earth;

Fig. 3, a sectional view of the switch illustrated in Fig. 2 and showing the internal structure thereof;

Fig. 4, a sectional view of the switch shown in Figs. 2 and 3 and with the contacts thereof separated to open the circuit;

Fig. 5, a sectional view on the line 5—5 of Fig. 4;

Fig. 6, a sectional view on the line 6—6 of Fig. 3 and showing the switch contacts in closed position;

Fig. 7, a sectional view on the line 7—7 of Fig. 4, showing the switch contacts separated to open the circuit;

Fig. 8, an exploded view with parts in section for greater clarity and showing a T connector which may be utilized in the system of this invention and also showing a plug which may be employed to close one opening to the connector to exclude moisture therefrom;

Fig. 9, a sectional view similar to Fig. 8 and showing a T connector with two female connections and one male connection and with a plug installed in one female connection to exclude moisture therefrom;

Fig. 10, a sectional view of a T connector having one female connection and two male connections and with a cap installed over one male connection;

Fig. 11, an elevational view of the cap which is utilized to cover one of the male connections of the connector shown in Fig. 10;

Fig. 12, a sectional view of a fuse adapted for direct burial in the ground and having one female connector and one male connector;

Fig. 13, a sectional view on the line 13—13 of Fig. 12;

Fig. 14, a sectional view similar to Fig. 12, but showing a fuse having two female connections;

Fig. 15, a view similar to Fig. 14 but showing a fuse having two male connections;

Fig. 16, an exploded view showing a connector which may be utilized in the field to extend the system or to make connection thereto in which there is shown a female connector and a male connector;

Fig. 17, a view with parts in section for greater clarity and showing the male and female connectors of Fig. 16 in assembled relation;

Fig. 18, a perspective view showing a transformer which may be directly buried in the ground and in which connections may be made thereto from the distribution system and to a point of use subsequent to the transformer; and Fig. 19, a sectional view showing the internal structure of the transformer shown in Fig. 18.

With continued reference to the drawings there is shown in Fig. 1 an electrical distribution system in which its conductors as well as all other components of the system are adapted to be directly buried in the earth without the protection of any conduits, vaults, manholes or the like of waterproof nature required for underground distribution systems now in use. The ground level is represented by the line 10 and the system is supplied from a sub-station or other source 11 from which conductors 12, which may comprise insulated metallic cable covered by a neoprene sheath or other suitable protection, are laid in a trench in the ground which is subsequently covered. These conductors lead to sectionalizing switches 13. Switches 13 may either comprise a single pole switch for each line or may comprise multiple poles to take care of all of the lines in the system. Likewise, switches 13 may be installed in access handholes 14 or may be directly buried in the ground depending upon the requirements of the particular installation. The details of such a switch will be later described.

From switches 13 cables 15 may be laid under the ground preferably in a shallow trench such as might be formed by a plow and to these cables distribution transformers 16 may be connected, these transformers either being in the form of single units 17 to serve individual subscribers or the transformers 16 may be laid in a group, such as 18, to serve a subdivision, apartment house or other application where a plurality of closely grouped subscribers must be served.

The distribution transformers 16 are constructed to be directly buried in the ground and in order to achieve best results and to take full advantage of the potential benefits of the invention consideration must be given to the material to which the casing is formed.

Primarily the material must be moldable and in order to be fully satisfactory should possess certain additional properties of which the following are important. It should be non-porous to both gases and liquids and should be substantially impervious to acids and alkalies of the kind and concentration ordinarily encountered in earth installations as well as resistant to the action of earth bacteria or fungus. It should be substantially impervious to deterioration from the action of the atmosphere, particularly with reference to the sun rays. It should be capable of resisting without adversely affecting its mechanical and electrical properties extremes of temperature conditions of sub-zero temperatures to the high temperatures encountered in above ground installations in tropic or desert locations. It should be relatively firm and non-frangible and preferably have a certain degree of elasticity. It should be as free as possible from inherent ageing with time, it should have reasonably good physical properties particularly the quality of toughness and should have relatively high dielectric strength. As previously mentioned flexible cable suitable for direct ground burial, have previously been employed and in the development of such cables it has been found that in the present state of the materials art the class of materials which most satisfactorily meets requirements of the nature of those noted above are synthetic polymers of compounds productive of products generically known as "synthetic rubber" of which the following may be mentioned as examples: "GR–S" (Government Rubber Styrene) a polymeric product of butadiene and styrene; "low temperature rubber" also a polymeric product of butadiene and styrene; "neoprene" which is a generic term for a number of chloroprene polymers of different grades and designated as GR–M plus numerical designations for the several grades; "butyl rubber," a copolymer of isobutylene and isoprene; and "Buna N"; GR–A (Government Rubber, Acrylonitrile) a copolymer of butadiene and acrylonitrile. To those skilled in the materials art it will be evident that a substantial variety of materials suitable for the purpose are available and that they need not be limited to synthetic rubbers in order to carry out the invention. Such other materials may include synthetic resins such as "polythene." The use of natural rubber, however, is not to be recommended, because of its inherent deterioration with time, or so-called ageing characteristic. The specific material employed will therefore be dictated by specific conditions in different cases.

Of the foregoing material neoprene is one of the more satisfactory and for purposes of further description herein it will be assumed without limitation that neoprene is the material employed. These transformers may be similar to those described in co-pending application, Serial No. 132,335, filed December 10, 1949, or they may take other forms and a brief description of one suitable type of transformer will be given later in this application.

In systems of the kind under consideration some form of overload disconnecting device is desirable in the primary circuits of the transformers and for a system embodying the present invention, such devices are advantageously in the form of fuses. As shown herein the transformers 16 are connected to the conductors 15 through one or more fuses 19 in the primary circuit. Fuses 19 also are of a type capable of being directly buried in the ground and are intended as disposable items to be romved and replaced by new fuses if burnt out due to overload on the circuit. A suitable fuse for this use will be later described by way of example but without limitation as to the specific form of disconnecting device which may be employed within the contemplation of the invention.

The conductors 15 may be provided with T connectors 20 which may be prefabricated in the conductors or which may be installed at desired intervals in the field. These T connectors are likewise suitable for direct burial in the ground and a suitable component for this application will be later described.

A group of transformers 18 may be conveniently connected to the system through a single switch 13 which may be either directly buried in the ground or may preferably be installed in an access handhole 21 which only requires a shallow depression in the ground and presents no difficulty in installation or maintenance, since it need not be waterproof and can even be flooded without damage to the system.

At desired intervals the conductors 15 may be joined to additional conductors or, in the event it is desired to extend the complete system to serve other areas as they develop, connectors 22 are adapted for direct burial in the ground and may take the form of those described in the co-pending application, Serial No. 196,304, filed by Leslie M. Merrill, November 17, 1950, and a brief description will later appear in this application.

At suitable intervals in the distribution system other switches 13 may be installed in order to isolate certain portions of the system in the event of trouble therein. This eliminates the necessity of cutting off the supply of current to the complete distribution system, it being only necessary to isolate the portion where the trouble has occurred thus permitting normal service to continue in the other parts of the system. Likewise, it is contemplated that the system will be supplied with electricity from a sub-station 11 or other source located at each end thereof so that in the event of failure of one portion of the system or of the power source at one end, either the entire system or a portion thereof may be supplied with current from the source located at the other end of the system.

While the distribution transformers are designed to be directly buried in the ground, nevertheless, it is contemplated that the transformers may also be installed in a basement or other enclosure of the building to be supplied with electricity and suitable connections on each transformer are provided to permit the attachment of conductors 23 for serving the dwelling or other building from the system. The electrical layout of the above-described system is typical of distribution systems now installed above ground and is intended to provide the necessary components and technique for installing this system underground in relatively shallow trenches used in conjunction, as and when desired, with simple and inexpensive access handholes, requiring no prefabricated conduits or relatively expensive waterprof vaults or manholes.

A suitable access handhole for receiving the switches 13 or any of the other components of this system is shown in Fig. 2 and this may comprise a cast or fabricated body 24, usually metallic, having a flange 25 adjacent the upper end thereof, there being apertures 26 in this flange for receiving fastening means for attaching a cover plate (not shown) thereto. However, if desired, other fastening means such as a bayonet joint might be employed for securing the cover plate in place. The body 24 may be supplied with apertures 27 serving to receive conductors 28 passing into the body 24 of the handhole, the conductors 28 being provided with connectors, the details of which will be later described. Also, if desired, the body 24 of the handhole may be provided on the bottom thereof with an upstanding ear 29 to which the switch 13 may be attached.

As best shown in Figs. 3 to 7 the switch 13 may comprise a molded base member 30 having an ear 31 with an aperture 32 therein cooperating with the upstanding ear 29 in the handhole 24, it being only necessary to insert a pin 33 in the aperture 32 and the aperture in the ear 29 to securely fasten the switch 13 within the handhole 24.

Also molded in the base member 30 is a female contact element 34 having a flange 35 adjacent the lower end thereof to firmly support the same in the base member 30. The contact element 34 is provided with spaced substantially parallel upstanding resilient fingers 36 which are provided at their open ends with angularly disposed outwardly extending flanges 37. The fingers adjacent the flanges 37 are deformed outwardly to provide opposed longitudinally extending grooves 38 the purpose of which will be presently described.

Screw-threaded fastening means or the like 39 serves to secure a conductor 40 to the contact element 34 conductor 40 terminating at its opposite end in a female connector element 41 embedded in the material of the base member 30. The female connector member 41 terminates inwardly of the outer surface of the base member 30 and communicates with an opening 42 molded into the base member, opening 42 serving to cooperate with a connecting cable (not shown) to provide a male and female connection in a manner to be later described. The contact element 34, conductor 40 and female connector element 41 would be assembled prior to molding in the base member 30.

Also molded in the base member 30 are a pair of upstanding pins or pillars 43 having flanges 44 at one end thereof to firmly anchor the same in the base member 30 and the purpose of these pins or pillars will be presently described. Likewise, molded in the base member 30 is one end 45 of a coil spring 46.

The head member 47 is similar to base member 30 and is provided with an ear 48 molded therein, this ear having an aperture 49 the purpose of which will be presently described. The male contact element 50 of switch 13 which cooperates with female contact element 34 to open and close the circuit comprises a housing 51 molded into the head member 47, there being provided flanges 52 adjacent the upper end of the housing 51 in order to provide a firm engagement between the head member 47 and the housing.

Slidably mounted within the housing 51 for vertical movement is a contact blade 53, this blade when in lowermost position extending between and engaging the spring fingers 36 of the female contact element 34 to complete the electrical circuit. The blade 53 is provided adjacent the lower end thereof with transversely extending ribs 54 which serve to interengage with the grooves 38 for a purpose to be presently described.

The blade 53 is provided adjacent its upper end with laterally extending flanges 55 and the housing 51 is provided with an inwardly extending flange 56 which serves to limit upward movement of the blade 53 within the housing 51. The housing 51 is provided adjacent its lower end with an inwardly extending flange 57 and between this flange and the flanges 55 on blade 53 there are disposed a pair of compression springs 58 which serve to resiliently urge the blade 53 upwardly within the housing 51 toward its uppermost position.

A flexible conductor in the form of a pig tail 59 is connected to the upper end of blade 53 by screw-threaded fastening means or the like 60, the opposite end of the pig tail 59 being secured by screw-threaded fastening means or the like 61 to the housing 51 and to a conductor 62 which terminates in a female connector element 63 embedded in the material of the head member 47. The female connector element 63 terminates in opening 64 molded into the head member 47, this opening 64 cooperating with a cable to complete an electrical connection in a manner to be later described.

The opposite end 65 of coil spring 46 is also embedded or molded into the material of the head member 47. Socket members 66 are also molded into the head member 47 and these socket members comprise a relatively shallow portion 67 and a relatively deep tubular portion 68, the shallow portion 67 being arcuate in formation and the function of these socket members will be presently described.

The switch 13 is sealed against the entrances of moisture or other foreign material by a bellows 69 which may be made of neoprene or other suitable flexible and resilient material such as that described above, bellows 69 being molded integrally with the base member 30 and head member 47.

As shown in Figs. 3 and 6, the switch is in the closed or circuit-making position and in this position the blade 53 of the male contact element 50 engages between the spring fingers 36 of the female contact element 34. This serves to complete the circuit between the female connectors 41 and 64 and the surface area of the blade 53 and spring fingers 36 which is in contact serves to provide a suitable path for the passage of the electrical current. In this position of the switch the pillars 43 are received in the tubular extensions 68 of the socket members 66.

When it is desired to break or open the circuit it is only necessary to engage the aperture 49 of ear 48 with a hook 70 having a T handle or other convenient engaging means 71 to lift the head member 47 upwardly. Upward movement of head member 47 compresses springs 58 of the male contact element 50 until the upward force exerted by these springs overcomes the holding effect of the engagement of the ribs 54 with grooves 38 in the spring fingers 36 at which time the blade 53 will move upwardly with a snap action to preclude any possibility of setting up an arc between the contact elements at the time of breaking the circuit. Such a snap action is necessary in high voltage circuits of the type contemplated since the arc established by a slowing separation of the contacts would result in severe damage and rapid failure of the equipment. To retain the contacts in open circuit position the hook 70 is rotated to bring the upper ends 72 of the pillars 43 into the shallow portion 67 of the socket members 66, the upper ends 72 of the pillars 43 bearing against this portion of the socket members 66 to maintain the male contact element 50 out of engagement with the female contact element 34, as shown in Figs. 4 and 7. This condition is thus maintained until it is again desired to close the circuit. Closing of the circuit is accomplished by turning the hook 70 in the opposite direction to align pillars 43 with the tubular extensions 68 of the socket members 66 whereupon the spring 46 will move the blade 53 of the male contact element 50 downwardly between the spring fingers 36 of the female contact element 34, thus reestablishing contact and completing the circuit between the female connector elements 41 and 63.

While the housing 51 of the male connector element 50 may be made of metallic or non-metallic material, it is to be noted that none of the electrical current is carried by this member but that the entire flow of such current is through the flexible pig tail 59 which maintains a low resistance electrical path.

Thus it will be seen that by the above-described switch there has been provided a relatively simple and inexpensive electrical control device which is completely moisture-proof, which may be directly buried in the ground, or which may be mounted in an access handhole in which no particular means need be provided to exclude moisture therefrom. The switch may be readily made self-quenching by filling the bellows 69 with a suitable quenching agent and the switch, as described, is readily adapted to usual electrical distribution circuits.

A variety of T connectors suitable for direct burial in the ground are shown in Figs. 8, 9 and 10, these connectors comprising a molded body 72 housing three female connector elements 73, 74 and 75. These connectors may conveniently comprise a solid central portion 76 having annular grooves 77 which serve to provide a firm anchorage in the material of the connectors 72, each of the connector elements having a tubular portion 78 and longitudinal slits 79 therein to impart sufficient resiliency thereto. In order to reinforce the slit tubular portions 78 there may be provided a split sleeve 80 surrounding each portion 78, this sleeve serving to exclude flow of the molding material of the T connectors 72 into the slits 79 and also serving to reinforce the fingers formed by the slits 79.

The connectors 72 are also provided with accurately formed openings 81, 82 and 83 on each arm which serves to receive the conductor having a male connection thereon and to provide a tight moisture-proof seal.

The diameter of openings 81, 82 and 83 is slightly less than the diameter of the portion of the male connection received therein in order to provide a force fit and thus exclude moisture from the connection. The exact nature of this connection and fit will be more fully described in connection with the description of the connector which appears below.

Since it is occasionally necessary to close one of the openings 81, 82 or 83, there has been provided a plug 84 which may have a substantially cylindrical portion 85 for tight insertion in one of the openings, there being a flange 86 to engage the outer end of the T connector 72 and to facilitate the insertion and removal of the plug 84. Thus, a T connector 72 may be provided at the end of a prefabricated cable or may be inserted in a cable with one of the arms of the T connector plugged to prevent the entrance of moisture thereto thus providing a connection which may be utilized at a later date.

In Fig. 9 there is illustrated a modification of the connector shown in Fig. 8 in which one of the arms is provided with a male connector 87 molded into the body 72 and firmly anchored thereto by the grooves 77. A portion 90 of the body 72 surrounds a portion of the connector 87 and is accurately sized so as to mate with a cooperating female connector element and provide a moisture-proof joint. Fig. 9 also shows the sealing plug 84 installed in the connector body 72.

Fig. 10 shows a further modification of the T connector in which two male connecting elements are provided and also in which a cap for the male connector element may be utilized to protect the same against moisture or other foreign materials. The protector cap, as shown in Figs. 10 and 11, comprises a body 91 which may be made of yieldable moldable material such as neoprene or the like and having a tapered nose portion 92 to present a streamlined appearance and prevent inadvertent removal by engagement with projections when being dragged along the ground or during other use. The body 91 has a central bore 93 to receive the male connector element 87 and an enlarged bore 94 of a diameter to snugly engage the portion 90 of the T connector body 72 to provide a moisture-proof joint and to protect the male connector element.

In Figs. 12 and 13 as shown a fuse element 19 which is adapted for direct burial in the earth and this form of the fuse element is described in order to provide one of the components for use in the system above described. Obviously, however, the fuse 19 may take many other forms and the form illustrated and described is for illustrative purposes only and any suitable structure which will exclude moisture and maintain proper service when buried in the ground may be utilized. The fuse illustrated in Figs. 12 and 13 may comprise a link 95 of any suitable fusible material, which link may be secured at each end to connector elements 96 and 97, connector 96 being shown as a female element and connector 97 being shown as a male element. The connector elements 96 and 97 are directly molded in a body 98 and are firmly anchored therein by annular grooves 100. The entire fuse assembly may be surrounded by a sheath 101 of neoprene or the like which is firmly bonded thereto and provides a moisture-proof assembly. The female connector element 96 and the male connector element 97 are similar in every respect to those described in connection with the T connector illustrated in Figs. 8 to 10.

Figs. 14 and 15 illustrate modifications of the fuse element above-described, that in Fig. 14 providing two female connecting elements and that in Fig. 15 providing two male connecting elements. Thus, fuses of this general nature may be provided for any desired application regardless of the type of connector which is already on the cable which may have been installed, or systems may be designed with any particular connector desired. Likewise, the fuse may be filled with a quenching agent to prevent fire or explosion upon melting of the fusible element 95 and breaking of the circuit.

In Figs. 16 and 17 there is illustrated a connector 22 which may be utilized for connecting the distribution transformers, fuses, switches, and the like and this connection likewise provides means for conveniently fabricating the same in the field and provides a completely weather-proof connector which is adapted for direct burial in the ground and which is unaffected by the elements while still providing an electrical path of exceptionally low resistance. Since this connector is described and claimed in the co-pending application above referred to, any detailed description thereof is considered unnecessary in this application since reference may be made to the co-pending application for such a description. Briefly, however, the connector comprises a female portion 102 having an enlarged body bonded to the cable 103, the enlarged body receiving and securely anchoring a female connector element 104 which is connected to the conductor 105 by soldering or other suitable means. The female connector element 104 is provided with spring fingers 106 formed by slits 107 and this connector element serves to receive a male connector element 108 in the form of a metallic cap soldered or otherwise secured to a conductor 109 of cable 110. A portion 111 of cable 110 adjacent the male connector element 108 is preferably slightly reduced in size to provide an accurate diameter which firmly but slidably engages with a force fit in the opening 112 of the female connector body 102. While the portion 111 is shown reduced, obviously, this portion might be larger than the main body of the cable 110 but the purpose of this reduced portion is to compensate for variations in diameter of commercial cable which normally is not held to particularly close tolerances. Therefore, the body thereof may be reduced by a suitable tool to an accurate dimension thus providing a moisture-proof and tight joint. The connector is shown in assembled condition in Fig. 15. The relative diameters of the opening 112 and the reduced portion 111 as well as a description of a tool to effect the reduction is given in the companion application above referred to.

In Figs. 18 and 19 there is shown a distribution transformer which is adapted for use with the system of this invention and which may be directly buried in the earth without harmful effects. A transformer suitable for this application is described and claimed in the co-pending application, above referred to, and reference thereto is made for a detailed description thereof. However, for purposes of illustration a brief description of a suitable slightly modified transformer will be given in this application.

The transformer may comprise a unitary molded body 113 provided with connector apertures 114. A portion of the apertures 114 may be disposed in projections or bosses 115 integral with the body 113 the walls of these bosses being relatively resilient to cooperate with a male connector element and provide a moisture-proof joint. As shown in Fig. 19 the body 113 encloses a core-coil assembly 116 to which leads 117 are connected. Leads 117 are secured by any suitable means, such as soldering, to female connector elements 118 directly molded into the body 113. Connector elements 118 may be provided with annular grooves 119 to more firmly anchor the same in place. While female connector elements have been shown in the drawing, obviously, these may all be male connector elements or for specific applications some of the elements may be male and some may be female. The connector elements 118 are substantially identical with the connector elements described in connection with the T connector and the fuse. The openings 114 in the body 113 are of such a size as to firmly engage the conductor connected thereto and to exclude moisture from the joint. Also, if desired, the leads 117 may be made up in the form of a harness or may be secured to an anchoring structure which is imbedded in the body of the transformer 113 thereby preventing undue stress on the connection between the leads and the coils of the transformer. This stress frequently occurs during the molding operation and it has been found in certain instances that it is necessary to provide such an anchorage for these leads. However, for clarity and illustration, this anchorage has been eliminated and reference is made to the copending application, mentioned above, for a suitable structure for this purpose.

It will be seen that by this invention there has been provided an electrical distribution system which is particularly adapted to be directly buried in the ground without deleterious effect on any of its components and the invention also provides components which are suitable for such application. Likewise, the system and components herein described are as well adapted to installation directly on the surface of the earth as in emergency or advanced military lighting systems and, in these cases, the components will withstand the normal atmospheric conditions encountered and also the normal abrasion and other wear which might be experienced. The system of this invention may be designed and prefabricated for specific installations or the cable may be supplied in bulk and all of the necessary components supplied, and the complete system may be made up and installed in the field. This is made possible by the particular connectors utilized which may be completely made up in the field and will provide a moistureproof connection sufficiently strong to withstand the normal stresses encountered during use.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption and switch means in said primary circuits for isolating selected portions of said system from said sources, all of said components being hermetically sheathed in non-metallic moisture-proof material of the class resistant to earth acids, alkalies, bacteria and fungus and including moisture-proof disconnectable joints between the sheathing material of said components for connecting the several components into the system.

2. A system for sub-surface distribution of electrical energy as defined in claim 1 in which said non-metallic moisture-proof material is of the class commonly known as synthetic rubber.

3. A system for sub-surface distribution of electrical energy as defined in claim 1 in which said non-metallic moisture-proof material comprises neoprene.

4. A system for sub-surface distribution of electrical energy from one or more sources to a plurality of places of consumption, said system including as components thereof conductors providing primary feeder circuits, transformers fed from said circuits, said transformers being adapted to be directly buried in the earth and comprising a core-coil assembly, a homogeneous mass of insulating material surrounding said assembly and filling the interstices thereof, connector elements for detachable connection with external conductor cables embedded in said material and connected to said coil and means adjacent each connector element for engaging the surface of a cable and providing a moistureproof joint, conductors providing secondary circuits fed by said transformers for supplying said places of consumption, switch means in said primary circuits for isolating selected portions only of said system from said source, all of said components being hermetically sheathed in non-metallic moisture-proof material of the class resistant to earth acids, alkalies, bacteria and fungus and including moisture-proof disconnectable joints between the sheathing material of said components for connecting the several components into the system.

5. A system for sub-surface distribution of electrical energy from one or more sources to a plurality of places of consumption, said system including as components thereof conductors providing primary feeder circuits, transformers fed from said circuits, said transformers being adapted to be directly buried in the earth and comprising a core-coil assembly, a homogeneous mass of insulating material surrounding said assembly and filling the interstices thereof and connector elements for detachable connection with external conductor cables embedded in said material and connected to said coil, conductors providing secondary circuits fed by said transformers for supplying said places of consumption, and switch means in said primary circuits for isolating selected portions only of said system from said source, all of said components being hermetically sheathed in non-metallic moisture-proof material of the class resistant to earth acids, alkalies, bacteria and fungus and including moisture-proof disconnectable joints between the sheathing material of said components for connecting the several components into the system.

6. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption and switch means in said primary circuits for isolating selected portions only of said system from said source, said switch means comprising a base member, a contact element supported by said base member, a head member in axial alignment with said base member and supporting a contact element, resilient means connecting said head and base members to bias said contact elements into engagement, means for maintaining said contacts out of engagement with each other, bellows connecting said base and head members to prevent entry of moisture therebetween and means to facilitate movement of said head and base members toward and away from each other, all of said components being hermetically sheathed in non-metallic moisture-proof material of the class resistant to earth acids, alkalies, bacteria and fungus and including moisture-proof disconnectable joints between the sheathing material of said components for connecting several components into the system.

7. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption and switch means in said primary circuits for isolating selected portions only of said system from said source, said switch means comprising a base member, a female contact element and upstanding pillars supported by said base member, a head member in axial alignment with said base member and supporting a male contact element, socket members embedded in said head member and including shallow portions and elongated tubular portions, a tension spring connected to said base member and said head member for biasing said male and female contacts into engagement, said pillars engaging said shallow portions of said socket members to maintain said contact members out of engagement and engaging said tubular portions to permit engagement of said contacts, a bellows connecting said base and said head members to prevent entry of moisture therebetween, a quenching agent within said bellows and means to facilitate movement of said head and base members towards and away from each other, all of said components being hermetically sheathed in non-metallic moisture-proof material of the class resistant to earth acids, alkalies, bacteria and fungus and including moisture-proof disconnectable joints between the sheathing material of said components for connecting the several components into the system.

8. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption, switch means in said primary circuits for isolating selected portions only of said system from said sources, said switch means comprising a molded base member, a female contact element supported by said base member, upstanding pillars supported by said base member, a molded head member in axial alignment with said base member, socket members embedded in said head member and including shallow portions and elongated tubular portions, a male contact element comprising a housing carried by said head member, a contact blade slidably mounted for axial movement within said housing, means in said housing limiting axial movement of said blade, resilient means for biasing said blade inwardly of said housing, cooperating detent means on said blade and said female contact element, a tension spring connected to said base member and said head member for biasing said male and female contacts into engagement, whereby upon movement of said head member away from said base member said resilient means will exert an axial force on said blade to separate the same from said female contact element with a snap action, said pillars engaging said shallow portions of said socket members to maintain said contact elements out of engagement and engaging said tubular portions to permit engagement of said contact elements, a bellows connecting said base and head members to prevent entry of moisture therebetween, a quenching agent within said bellows and means to facilitate movement of said head and base members toward and away from each other, all of said components being hermetically sheathed in non-metallic moisture-proof material of the class resistant to earth acids, alkalies, bacteria and fungus and including moisture-proof disconnectable joints between the sheathing material of said components for connecting the several components into the system.

9. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption, switch means in said primary circuits for isolating selected portions only of said system from said sources, said switch means comprising a molded base member, a female contact element comprising spaced substantially parallel upstanding spring fingers having inwardly opposed transverse grooves supported by said base member, upstanding pillars supported by said base member, a molded head member in axial alignment with said base member, socket members embedded in said head member and including shallow portions and elongated tubular portions, a male contact element comprising a housing carried by said head member, a contact blade slidably mounted for axial movement within said housing, spaced inwardly extending flanges in said housing for limiting axial movement of said blade, resilient means engaging said housing and said blade for biasing said blade inwardly of said housing, transverse ribs on said blade for mating with said transverse grooves when said switch is in circuit closing position, a flexible pig tail connected to said blade for conducting electrical energy thereto, a tension spring connected to said base member and said head member for biasing said male and female contacts into engagement, whereby upon movement of said head member away from said base member said resilient means will exert an axial force on said blade to separate the same from said female contact element with a snap action, said pillars engaging said shallow portions of said socket members to maintain said contact elements out of engagement and engaging said tubular portions to permit engagement of said contact elements, a bellows connecting said base and head members to prevent entry of moisture therebetween, a quenching agent within said bellows and means to facilitate movement of said head and base members towards and away from each other, all of said components being hermetically sheathed in non-metallic moisture-proof material of the class resistant to earth acids, alkalies, bacteria and fungus and including moisture-proof disconnectable joints between the sheathing material of said components for connecting the several components into the system.

10. A system for sub-surface distribution of electrical energy from one or more sources to a plurality of places of consumption, said system including as components thereof conductors providing primary feeder circuits, transformers fed from said circuits, overload disconnecting devices in said primary circuits comprising a fuse adapted for direct burial in the earth and comprising an elongated body, connector elements at each end of said body, a fusible link joining said connector elements and a quenching agent in said body surrounding said link, said connector elements being embedded in said body and providing a moisture-proof fuse, conductors providing secondary circuits fed by said transformers for supplying said places of consumption and switch means in said primary circuits for isolating selected portions only of said system from said sources all of said components being hermetically sheathed in non-metallic moisture-proof material of the class resistant to earth acids, alkalies, bacteria and fungus and including moisture-proof disconnectable joints between the sheathing material of said components for connecting the several components into the system.

11. A system for sub-surface distribution of electrical energy from one or more sources to a plurality of places of consumption, said system including as components thereof conductors providing primary feeder circuits, transformers fed from said circuits, overload disconnecting devices in said primary circuits comprising a fuse adapted for direct burial in the earth, said fuse comprising a body, connector elements in said body, a fusible link joining said connector elements and a quenching agent in said body surrounding said link, said connector elements being embedded in said body and providing a moisture-proof fuse, conductors providing secondary circuits fed by said transformers for supplying said places of consumption and switch means in said primary circuits for isolating selected portions only of said system from said sources, all of said components being hermetically sheathed in non-metallic moisture-proof material of the class resistant to earth acids, alkalies, bacteria and fungus and including moisture-proof disconnectable joints between the sheathing material of said components for connecting the several components into the system.

12. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption, switch means in said primary circuits for isolating selected portions only of said system from said sources, means for introducing additional primary and secondary circuits including T connectors adapted to direct burial, said T connectors comprising a body, connector elements in said body, means cooperating with a mating connector element and cable to provide a moisture-proof joint and closure means for sealing any unused element of said connector against the entry of moisture or other foreign material, all of said components being hermetically sheathed in non-metallic moisture-proof material of the class resistant to earth acids, alkalies, bacteria and fungus and including moisture-proof disconnectable joints between the sheathing material of said components for connecting the several components into the system.

13. A system for sub-surface distribution of electrical energy from one or more sources to a plurality of places of consumption, said system including as components thereof, conductors providing primary feeder circuits, transformers fed from said circuits, conductors providing secondary circuits fed by said transformers for supplying said places of consumption, switch means in said primary circuits for isolating selected portions only of said system from said sources, means for introducing additional primary and secondary circuits including T-connectors adapted for direct burial, said T-connectors comprising a molded body, connector elements embedded in said body, means cooperating with a mating connector element and cable to provide a moisture-proof joint and closure means for sealing any unused element of said connector against entry of moisture or other foreign material, all of said components being hermetically sheathed in non-metallic moisture-proof material of the class resistant to earth acids, alkalies, bacteria and fungus and including moisture-proof disconnectable joints between the sheathing material of said components for connecting the several components into the system.

14. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption, all of said components being hermetically sheathed in non-metallic moisture-proof material of the class resistant to earth acids, alkalies, bacteria and fungus and including moisture-proof disconnectable joints between the sheathing material of said components for connecting the several components into the system.

15. A system for sub-surface distribution of electrical energy as defined in claim 14 in which said non-metallic moisture-proof material is of the class commonly known as synthetic rubber.

16. A system for sub-surface distribution of electrical energy as defined in claim 14 in which said non-metallic moisture-proof material comprises neoprene.

17. A system for sub-surface distribution of electrical energy from one or more sources to a plurality of places of consumption, said system including as components thereof conductors providing primary feeder circuits, transformers fed from said circuits, overload disconnecting devices in said primary circuits comprising a fuse adapted for direct burial in the earth and comprising an elongated body, connector elements at each end of said body, a fusible link joining said connector elements and a quenching agent in said body surrounding said link, said connector elements being embedded in said body and providing a moisture-proof fuse, conductors providing secondary circuits fed by said transformers for supplying said places of consumption, all of said components being hermetically sheathed in non-metallic moisture-proof material of the class resistant to earth acids, alkalies, bacteria and fungus and including moisture-proof disconnectable joints between the sheathing material of said components for connecting the several components into the system.

18. A system for sub-surface distribution of electrical energy from one or more sources to a plurality of places of consumption, said system including as components thereof conductors providing primary feeder circuits, transformers fed from said circuits, overload disconnecting devices in said primary circuits comprising a fuse adapted for direct burial in the earth, said fuse comprising a body, connector elements in said body, a fusible link joining said connector elements and a quenching agent in said body surrounding said link, said connector elements being embedded in said body and providing a moisture-proof fuse, conductors providing secondary circuits fed by said transformers for supplying said places of consumption, all of said components being hermetically sheathed in non-metallic moisture-proof material of the class resistant to earth acids, alkalies, bacteria and fungus and including moisture-proof disconnectable joints between the sheathing material of said components for connecting the several components into the system.

19. A system for sub-surface distribution of electrical energy from one or more sources to a plurality of places of consumption, said system including as components thereof conductors providing primary feeder circuits, transformers fed from said circuits, conductors providing secondary circuits fed by said transformers for supplying said places of consumption, means for introducing additional primary and secondary circuits including T connectors adapted to direct burial, said T connectors comprising a body, connector elements in said body, means cooperating with a mating connector element and cable to provide a moisture-proof joint and closure means for sealing any unused element of said connector against the entry of moisture or other foreign material, all of said components being hermetically sheathed in non-metallic moisture-proof material of the class resistant to earth acids, alkalies, bacteria and fungus and including moisture-proof disconnectable joints between the sheathing material of said components for connecting the several components into the system.

20. A system for sub-surface distribution of electrical energy from one or more sources to a plurality of places of consumption, said system including as components thereof, conductors providing primary feeder circuits, transformers fed from said circuits, conductors providing secondary circuits fed by said transformers for supplying said places of consumption, means for introducing additional primary and secondary circuits including T connectors adapted for direct burial, said T connectors comprising a molded body, connector elements embedded in said body, means cooperating with a mating connector element and cable to provide a moisture-proof joint and closure means for sealing any unused element of said connector against entry of moisture or other foreign material, all of said components being hermetically sheathed in non-metallic moisture-proof material of the class resistant to earth acids, alkalies, bacteria and fungus and including moisture-proof disconnectable joints between the sheathing material of said components for connecting the several components into the system.

References Cited in the file of this patent

UNITED STATES PATENTS

| | | |
|---|---|---|
| 473,932 | Kintner | May 3, 1892 |
| 1,225,366 | Schoeneman et al. | May 8, 1917 |
| 2,175,495 | Triplett | Oct. 10, 1939 |
| 2,251,898 | Sittler et al. | Aug. 5, 1941 |
| 2,413,897 | Wilson | Jan. 7, 1947 |
| 2,419,180 | Unger | Apr. 15, 1947 |

FOREIGN PATENTS

| | | |
|---|---|---|
| 618,701 | Great Britain | Feb. 25, 1949 |